(12) United States Patent
Pennemann et al.

(10) Patent No.: US 10,799,810 B2
(45) Date of Patent: Oct. 13, 2020

(54) CASCADE TRAY, RECTIFYING COLUMN CONTAINING SAID CASCADE TRAY, METHOD FOR OPERATING SUCH A RECTIFYING COLUMN, AND USE OF SAME

(71) Applicant: COVESTRO DEUTSCHLAND AG, Leverkusen (DE)

(72) Inventors: Bernd Pennemann, Bergisch Gladbach (DE); Jürgen Bausa, Kürten (DE)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 16/467,323

(22) PCT Filed: Dec. 4, 2017

(86) PCT No.: PCT/EP2017/081369
§ 371 (c)(1),
(2) Date: Jun. 6, 2019

(87) PCT Pub. No.: WO2018/104226
PCT Pub. Date: Jun. 14, 2018

(65) Prior Publication Data
US 2020/0061491 A1 Feb. 27, 2020

(30) Foreign Application Priority Data

Dec. 6, 2016 (EP) .................................... 16202419
Nov. 6, 2017 (EP) .................................... 17200048

(51) Int. Cl.
*B01D 3/24* (2006.01)

(52) U.S. Cl.
CPC .................................... *B01D 3/24* (2013.01)

(58) Field of Classification Search
CPC ........................................................ B01D 3/24
See application file for complete search history.

(56) References Cited

U.S. PATENT DOCUMENTS

| 2,005,316 | A | * | 6/1935 | Hall | ........................ B01D 3/24 196/139 |
| 2,085,522 | A | | 6/1937 | Baars | |
| 2,713,478 | A | | 7/1955 | Ragatz | |
| 3,083,148 | A | * | 3/1963 | Mojonnier | ............... B01D 3/22 202/158 |
| 4,439,350 | A | | 3/1984 | Jones, Jr. | |

(Continued)

FOREIGN PATENT DOCUMENTS

DE 949733 C 9/1956

OTHER PUBLICATIONS

Bausa, J., Pennemann B., Chemical Engineering Research and Design, 99 (2015) pp. 43-48.

(Continued)

*Primary Examiner* — Jonathan Miller
(74) *Attorney, Agent, or Firm* — Richard P. Bender

(57) ABSTRACT

The invention relates to a cascade tray suitable for use in a rectifying column and comprising openings in the weir-type cascade edge, to a rectifying column containing at least one cascade tray according to the invention, to a method for operating such a rectifying column, and to the use of a claimed rectifying column in the fractionation of specific substance mixtures.

15 Claims, 10 Drawing Sheets

(56) References Cited

U.S. PATENT DOCUMENTS

| | | | | | |
|---|---|---|---|---|---|
| 4,496,430 | A | * | 1/1985 | Jenkins | .................... B01D 3/22 |
| | | | | | 196/111 |
| 4,578,153 | A | * | 3/1986 | Newton | ................... B01D 3/18 |
| | | | | | 202/158 |
| 4,582,569 | A | * | 4/1986 | Jenkins | .................... B01D 3/22 |
| | | | | | 196/111 |

OTHER PUBLICATIONS

Bolles, William, Optimum Bubble-Cap Tray Design—Petroleum Processing, Mar. 1, 1956, pp. 82-95.
International Search Report—PCT/EP2017/081369; dated Feb. 6, 2018; Van Ganswijk, J.

\* cited by examiner

US 10,799,810 B2

CASCADE TRAY, RECTIFYING COLUMN CONTAINING SAID CASCADE TRAY, METHOD FOR OPERATING SUCH A RECTIFYING COLUMN, AND USE OF SAME

CROSS REFERENCE TO RELATED APPLICATIONS

This application is a national stage application under 35 U.S.C. § 371 of PCT/EP2017/081369, filed Dec. 4, 2017, which also claims priority to European applications EP 16202419.4, filed Dec. 6, 2016, and EP 17200048.1, filed Nov. 6, 2017, each of which is incorporated by reference herein.

FIELD OF THE INVENTION

The present invention relates to a cascade tray which is suitable for use in a rectification column and has openings in the cascade weir, a rectification column containing at least one cascade tray according to the invention, a method for operating such a rectification column and also the use of a rectification column according to the invention for fractionators specific mixtures of materials.

BRIEF DESCRIPTION OF THE FIGURES

The present invention will now be described for purposes of illustration and not limitation in conjunction with the figures, wherein.

DETAILED DESCRIPTION OF THE INVENTION

Figure 1:
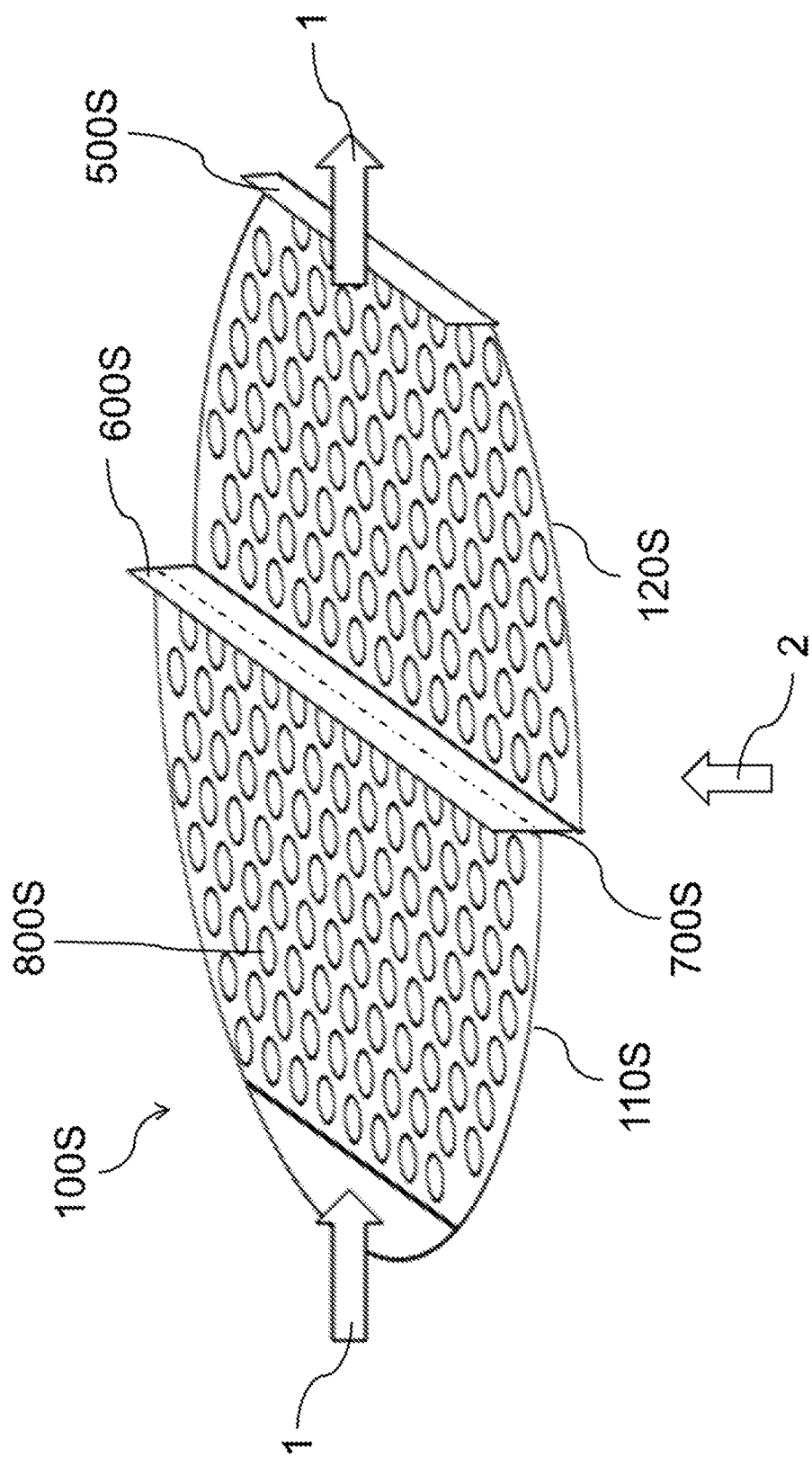
FIG. 1 is a perspective view of a cascade tray of the prior art.

In an industrial scale, distillations for separating mixtures of materials into their constituents are generally carried out in rectification columns. The main constituent of a rectification column is the column body; further constituents are, in particular, a vaporizer for vaporizing the mixture of materials to be separated and a condenser for liquefying the vapor. The column body contains various internals for increasing the separating power, (intensification of the heat exchange and mass transfer between a sending vapor [denoted by 2 in the drawings] and liquid trickling down [denoted by 1 in the drawings]), e.g. sieve trays, bubble cap trays or valve trays (tray columns), various types of packing elements (columns containing random packing elements) or structured packings (columns with ordered packing). Further internals are liquid collectors and liquid distributors by means of which uniform distribution of downflowing liquid (1) over the entire cross-sectional area of the column body is ensured. The column body usually has a cylindrical shape.

Among tray columns, a distinction is made between those with and without forced flow of the liquid. Trays having forced flow of the liquid are also referred to as "crossflow trays". The invention relates to such crossflow trays. Rectification columns having crossflow trays (crossflow trays will hereinafter be referred to as trays for short and the corresponding columns will be referred to as tray columns for short) have at least one tray via which liquid (1) flows from an inflow side to an outflow side and which has openings through which ascending vapor (2) can come into contact with the flowing liquid (1) within the column body. Such openings are preferably holes, valves with or without movable parts or bubble caps.

Figure 5:
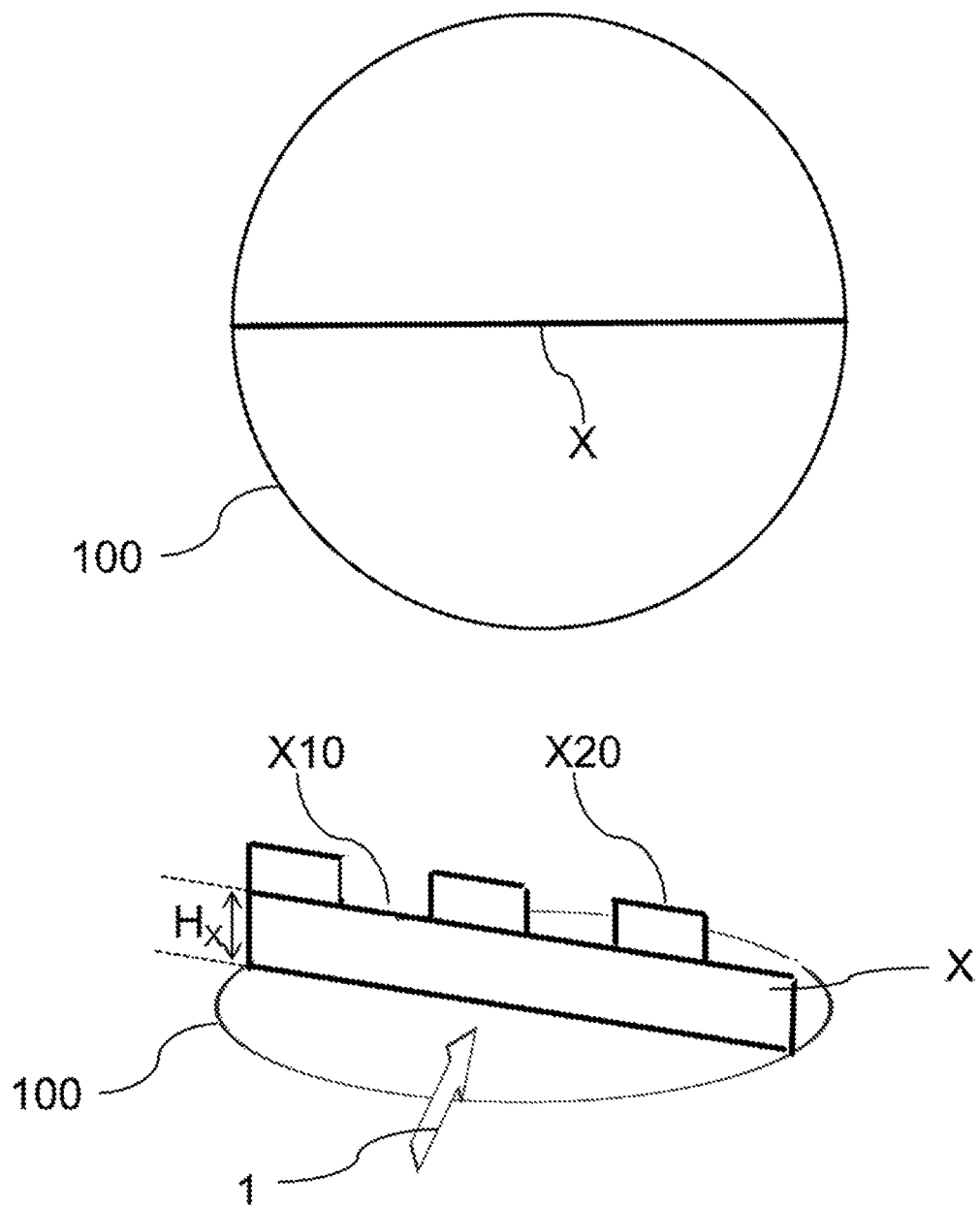
FIG. 5 shows the size and positioning of a weir having pinnacles on a cascade tray, in top and perspective views.

U.S. Pat. No. 4,439,350 describes a distillation column which simultaneously serves as chemical reactor, i.e. a chemical reaction takes place in addition to the separation of material. The process here is thus a reactive distillation. Crossflow trays which have weirs on the inflow and outflow side are described (cf. 17 and 12 in FIG. 2 and also 47 and 42 in FIG. 5). Perforated or porous hollow bodies ("container" 16 in FIG. 2 and also 46 in FIG. 5) in which a catalyst suitable for the desired reaction is present are arranged on these trays. The column is operated in such a way that these catalyst-filled hollow bodies are substantially covered with liquid, so that the catalyst present therein can perform its action. Such catalyst-filled hollow bodies are of course not weirs as understood by a person skilled in the art. The patent takes account of this by means of a consistent terminological distinction. In one embodiment (FIG. 5), the catalyst-filled hollow bodies are arranged substantially perpendicularly to the flow direction of the liquid. In order to ensure sufficient flow of the liquid, the trays are in this case provided with an inclination in the flow direction (as shown in FIG. 5) or a cascade-like arrangement having a plurality of planes is used (cf. column 5, line 64 to column 6, line 7). Whether weirs are in the latter case used at all at the steps of the cascade and if so how these are configured is not disclosed by the document.

In the case of trays having a large diameter and thus a long flow distance of the liquid (1), a large difference in the level of liquid between inflow side and outflow side can occur. This difference results from the flow distance of the liquid (1) and the gradient in the liquid level which is necessary for transport over the tray. An excessively high difference in the liquid level on the tray between inflow side and outflow side leads to the stream of ascending vapor (2) preferentially passing through the tray in the vicinity of the outlet since the height of the liquid column (1) is smaller there. For this reason, more vapor (2) passes through the openings in the vicinity of the outflow side of the tray than in the vicinity of the inflow side of the tray at the same driving pressure difference. The corresponding reduction in passage of the vapor in the region of the inlet leads, on the other hand, to "raining-through" in this region. Both effects result in the efficiency of the tray and thus the separating power of the rectification column decreasing. In order to prevent the effect described, tray columns having relatively large internal diameters (for example an internal diameter of 2.0 m or above, in particular 2.5 m or above) are often provided with cascade trays in which the flow distance of the liquid (1) is reduced, so that there is a smaller difference in the liquid level at the same gradient in the liquid level.

A cascade tray differs from a conventional tray in that the tray is divided into individual sections, at least two sections, and a vertical offset is present at the transition from one section to the next, so that the section of the tray closest to the liquid outlet is lower than the previous section. Above the "step" formed in this way, there is a weir (the cascade weir). A further weir is located at the outflow position (the outflow weir). FIG. 1 illustrates such a cascade tray of the prior art (100S) for the simplest case having one step. The arrows labeled 1 indicate the flow direction of the liquid.

The cascade weir is denoted by 600S, the step-forming offset by 700S and the outflow weir by 500S. As a result of this construction, the liquid (1) introduced firstly banks on the first half of the tray (inflow side, 110S) at the cascade weir (600S), flows over there, then reaches the section half of the tray (outflow side, 120S) and only then banks up at the outflow weir (500S) in order finally to overflow into the outflow shaft (not shown in FIG. 1).

Since the cascade weir is in the case of a circular column cross section (as is normally used) always longer than the outflow weir for geometric reasons, but the same amount of liquid flows over both weirs, the weir loading (volume flow per unit time and weir length) is smaller at the cascade weir than at the outflow weir. Since a smaller weir loading also results in a smaller overflow height, the liquid level on the inflow side (110S) would, at the same weir heights of cascade weir and outflow weir, be lower than on the outflow side (120S). This would lead to nonuniform loading of the two halves of the tray and thus decrease the separating power of the column. In order to prevent this, two variants are usually employed:

The cascade weir is made somewhat higher than the outflow weir, so that the sum of weir height and overflow height is the same for both weirs at the nominal column loading.

The cascade weir is configured as a "picket fence". Such a weir has rectangular cutouts at the upper edge, through which the liquid can pass. The cutouts begin at such a height and the "pinnacles" formed by the cutouts have such a height that it is ensured that liquid (1) can pass only through the cutouts. The cutouts can also have a different shape, in particular can be triangular, so that instead of "pinnacles", "serrations" are formed, as in the case of the blade of a saw. The height of the cascade weir in the region of the cutouts (corresponds to the height $H_X$ as defined below) corresponds to the height of the outflow weir, and the total length of the cutouts corresponds to the length of the outflow weir.

However, more recent studies have shown that, even when these measures are adhered to, cascaded trays (600S) can in particular operating states, in particular those having a comparatively low gas loading and small flows of liquid, i.e. at a low throughput, tend to have extremely different liquid levels on the two halves of the tray, which leads to the abovementioned problem of "raining-through" not being solved but under some circumstances even being worsened. This occurs when the liquid does not bank up on the first half of the tray (inflow side, 110S) to such an extent as would be necessary for it to flow over the cascade weir. In such a case, the liquid then "rains" entirely through the openings in the region of the inflow side (110S) of the tray. Owing to the lack of liquid flowing over the cascade weir, the second side of the tray (outflow side, 120S) does not receive any inflowing liquid stream (1), so that no liquid level can build up there either. Thus, the ascending vapor (2) can much more easily pass through the second, dry half of the tray (120S) then through the first half of the tray (110S) which has a certain liquid level. The consequence of this is that virtually the entire amount of vapor (2) passes through the tray via the openings (800S) in the second, dry half of the tray (120S) and thus does not come into contact with the liquid (1). This ultimately leads to a sever reduction in mass transfer and thus to a very low efficiency of the tray, which in turn worsens the separating power of the rectification column. This problem is discussed in *Chemical Engineering Research and Design,* 99 (2015), 43-48 (authors: J. Bausa and B. Pennemann). There, it is concluded that cascade trays should be used only when it is really necessary because a cascade tray may under some circumstances create more problems than it solves.

However, since cascade trays also have indisputable advantages, there is a need for further improvements in this field of engineering. In particular, it would be desirable to have cascade trays in which the liquid level on the two sides of the cascade weir is always the same or at least significantly less different than in the prior art in particular operating states. As a result, the above-described problem of extreme raining-through in particular operating states would not occur or, at the very least, only occur to a significantly reduced extent. This would contribute to rectification columns being able to be operated reliably in a greater number of operating states (in particular also at a small throughput) without the separating power being impaired. As a result, the availability of rectification columns would be increased, which in turn leads to a variety of economic (reduction of downtimes, possibility of a small throughput of mixture to be separated, part-load operation in the case of fluctuations in demand) and ecological advantages (reduced energy consumption).

Figure 2:
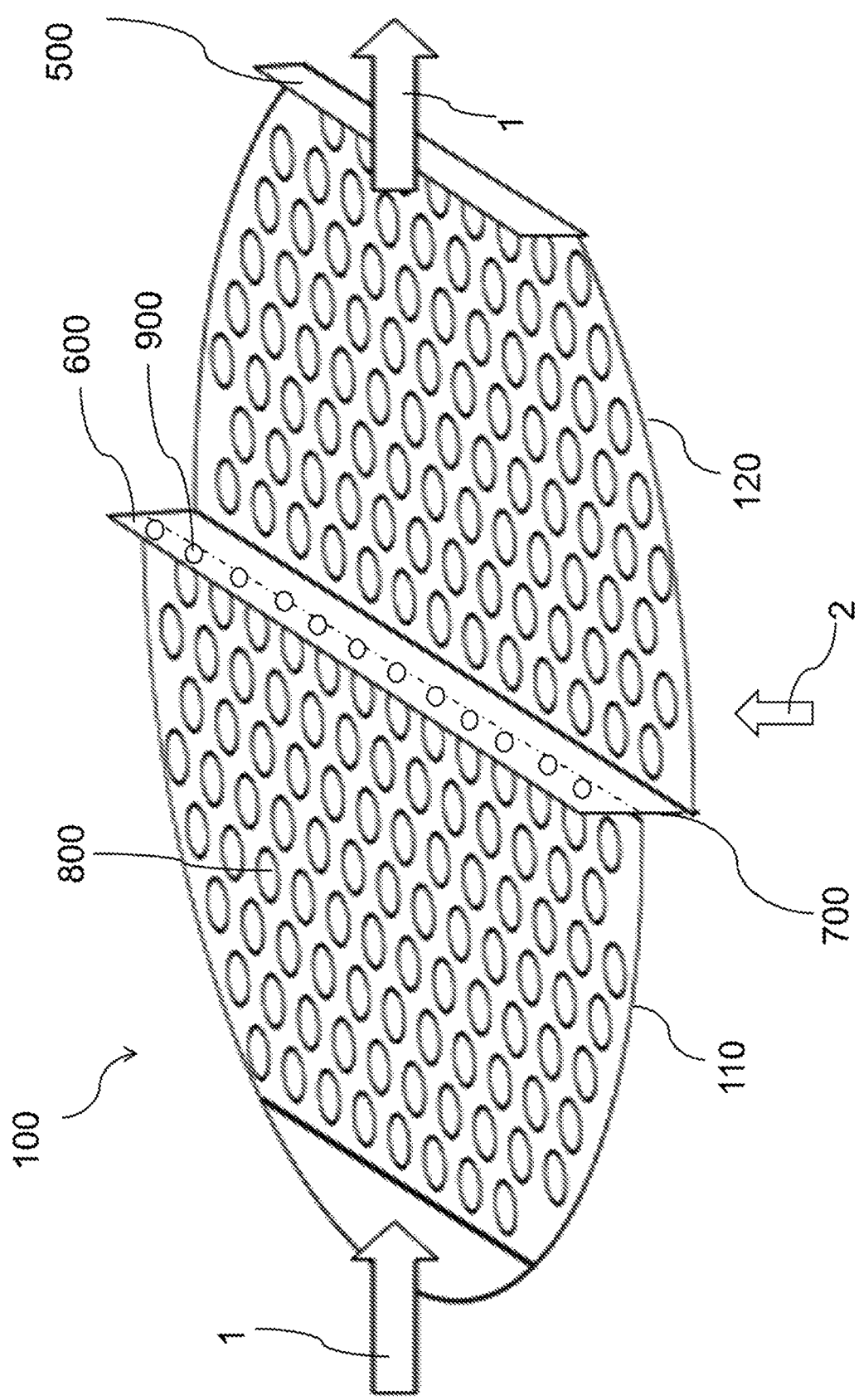
FIG. 2 is a perspective view of a cascade tray having openings in the cascade weir.

It has surprisingly been found that this need can be satisfied when cascade trays (100) which have openings (900) in the cascade weir (600) are used (cf. FIG. 2).

The present invention accordingly provides, in particular, a cascade tray (100) (preferably having a round, in particular circular base area) suitable for contacting liquid (1) flowing downward in a column body (200) with ascending vapor (2), where the cascade tray (100)

has an outflow weir (500) for banking up downflowing liquid (1) and has at least one further weir, the cascade weir (600), which is arranged upstream of the outflow weir, in particular arranged centrally in respect of the base area of the cascade tray (100), where the at least one cascade tray (100) has an offset (700) at the position of the at least one cascade weir (600) (in particular has a step) so that the part (120) containing the outflow weir (500) in the cascade tray (100) is at a lower level than the upstream part (110) of the cascade tray (100), and in both parts (110) and (120) of the cascade tray (100) (i.e. in the part (120) containing the outflow weir (500) in the cascade tray (100) and in the upstream part (110) of the cascade tray (100)) has openings (800), the openings (800) optionally being closable, for passage of the ascending vapor (2), wherein the cascade weir (600) has openings (900) for passage of the liquid (1) and in particular has from 1 to 20, preferably from 1 to 6, openings (900), where the openings (900) are preferably circular, square or rectangular holes and the total area of the openings is preferably from 0.5% to 3.0%, particularly preferably from 0.8% to 1.5%, of the total area which the cascade weir (600) would have without the openings (900).

The invention further provides a rectification column (10 000) containing at least one cascade tray (100) as described above, in particular a rectification column (10 000) for fractionating a mixture (10) of materials, wherein the rectification column (10 000) has at least one cascade tray (100) for contacting liquid (1) flowing downward in the column body (200) with ascending vapor (2), wherein the at least one cascade tray (100)

is hydrodynamically connected at a position, namely the inflow position (310) of the cascade tray (100), to a first reservoir (410) for liquid (1) flowing downward in the column body (200) and to another position, namely the outflow position (320), opposite the inflow position (310) to a second reservoir (420) for accommodating the liquid (1) flowing out from the at least one cascade tray (100) via an outflow weir (500), has at least one further weir, the cascade weir (600), which is arranged between the inflow position (310) and the outflow position (320), in particular is centrally arranged, where the at least one cascade tray (100) has at least one offset (700) at the position of the at least one cascade weir (600) (in particular has a step) so that the part (100) which contains the outflow weir (500) and is located in the direction of the outflow position (320) in the at least one cascade tray (100) is lower than the upstream part (110) of the at least one cascade tray (100), in both parts (110) and (120) of the cascade tray (100) (i.e. in the part (120) containing the outflow weir (500) in the cascade tray (100) and in the upstream part (110) of the cascade tray (100)) has openings (800), the openings (800) optionally being closable, for passage of the ascending vapor (2), in particular holes, valves, valves without movable parts and/or bubble caps, where the cascade weir (600) has openings (900) for passage of the liquid (1) flowing from the first reservoir (410) via the at least one cascade tray (100) into the second reservoir (420) and in particular has from 1 to 20, preferably from 1 to 6, openings (900), where the openings (900) are preferably circular, square or rectangular holes and the total area of the openings is preferably from 0.5% to 3.0%, particularly preferably from 0.8% to 1.5%, of the total area which the cascade weir (600) would have without the openings (900).

Figure 3:
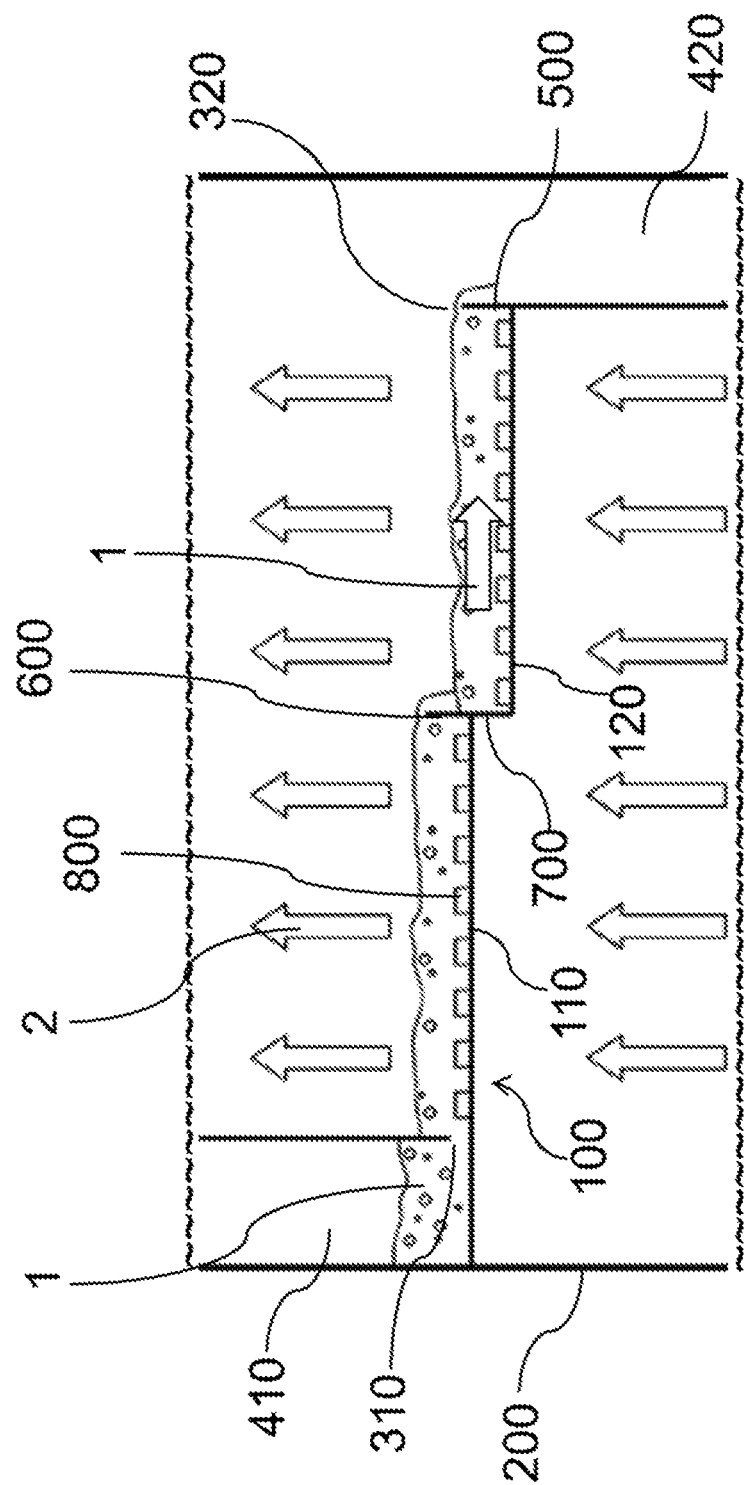
FIG. 3 shows the positioning of the cascade tray, and liquid and vapor flows, inside of a rectification column.

FIG. 3 shows a section of a rectification column (10 000) according to the invention.

The invention further provides a method for operating a rectification column (10 000) according to the invention and also the use of a rectification column (10 000) according to the invention for fractionating specific mixtures (10) of materials.

"Cascade trays (100)" according to the invention preferably have a round, in particular circular, base area, as can readily be seen in FIGS. 1, 2, 4 and 5, since they are to be suitable for installation in rectification columns and the latter generally have a cylindrical shape.

The liquid (1) flows over the cascade tray (100), as shown in all figures, with the flow direction being indicated by a block arrow.

The cascade tray (100) is divided by the at least one "offset (700)" (in particular a step) into at least two "parts", namely a part (120) containing the outflow weir (500) and an upstream part (110), which, viewed in the flow direction of the vapor (2), have different heights (i.e. one is lower than the other) and can therefore also be referred to as planes. If there is more than one offset (700), there are correspondingly more than two parts (planes). In this case, all parts (planes) have "has openings (800), the openings (800) optionally being closable, for passage of the ascending vapor (2)". The cascade tray (100) of the invention preferably comprises precisely one offset (700), i.e., in particular, precisely one step, and consequently comprises precisely two parts (planes), namely the part (120) containing the outflow weir (500) and the upstream part (110).

For the purposes of the present invention, the term "weir" is used, quite consistently with the understanding of a person skilled in the art, for a device by means of which the flow of liquid, i.e. specifically the liquid (1) flowing over the cascade tray (100), is banked up. This applies both to the cascade weir (600) and the outflow weir (500). The liquid flows over the respective weir and, in the case of the cascade weir (600), also through the cascade weir openings (900) and, in the case of the outflow weir (500), optionally also through the outflow weir openings (910) which are present in particular embodiments and are described in more detail below. "Weirs" are, for the purposes of the present invention, devices which are preferably made of metal or plastic, in particular of metal. "Weirs" are, for the purposes of the invention, not catalyst-filled hollow bodies. "Weirs" are, for the purposes of the invention, solid devices, with of course the exception of the cascade weir openings (900) and optionally the outflow weir openings (910), i.e. they are also not porous.

"Weirs" used according to the invention (cascade weir and outflow weir) are positioned essentially perpendicularly, in particular perpendicularly, on the cascade tray (100) and have an essentially rectangular base shape. This means that the weir, viewed parallel to the base area of the cascade tray (100), has (i) either a rectangular shape or (ii) has cutouts at its upper edge which lead to formation of "pinnacles" or "serrations" (see the explanations above).

Examples of (i) are shown schematically in FIG. 4 for a cascade tray (100) having a circular base area, where the offset (700) is not shown for reasons of simplification of the drawing. Likewise for reasons of simplification of the drawing, only one weir which can be either the cascade weir (600) [where the openings (900) are in the interests of simplicity not drawn in] or the outflow weir (500) and will hereinafter be denoted by "X". This weir "X" is in the interests of simplicity drawn in centrally; this is not to be interpreted as a necessary restriction.

Figure 4A:
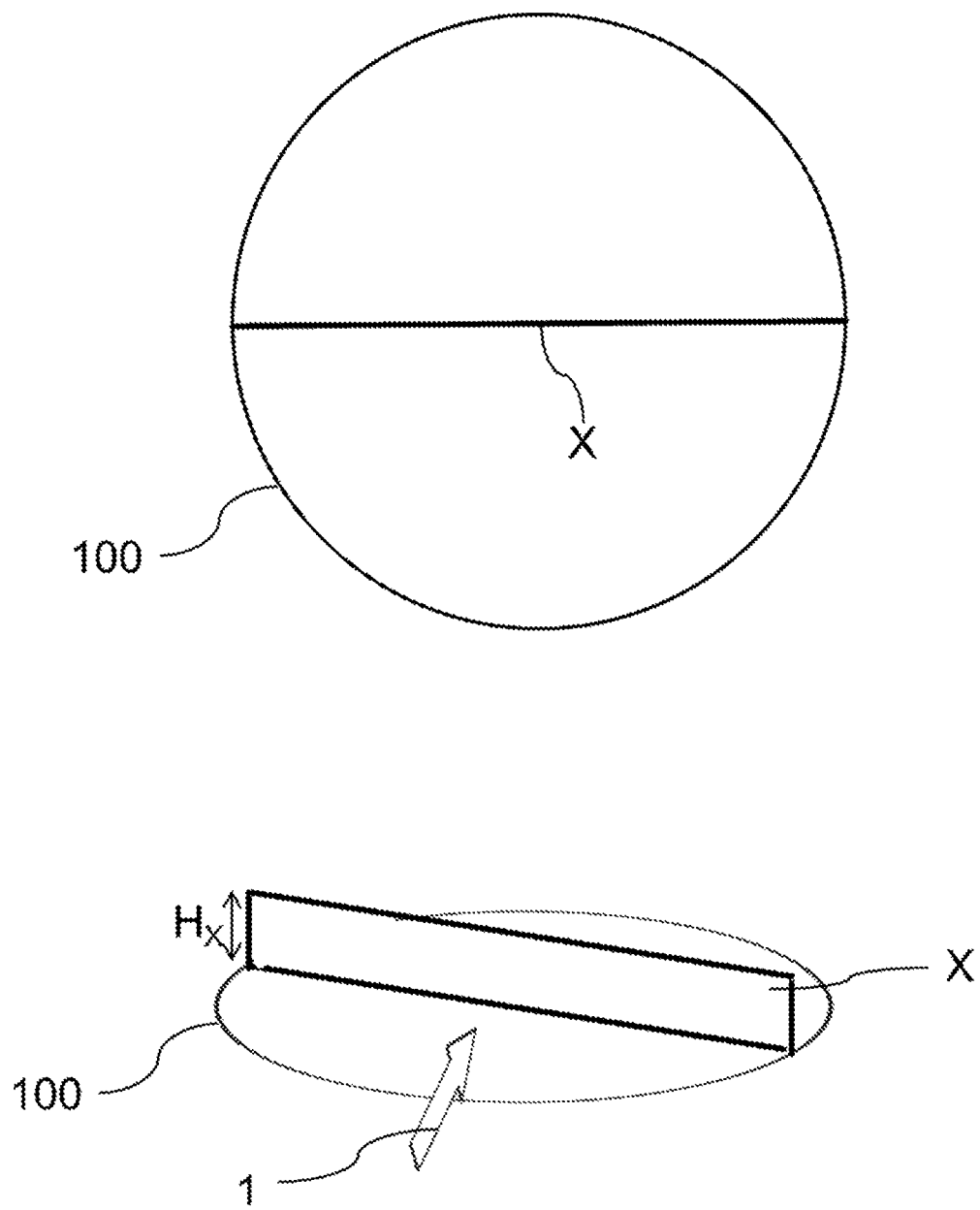
FIG. 4a shows the size and positioning of a weir on a cascade tray, in top and perspective views.

FIG. 4a shows an example of a weir X having a rectangular shape in the plan view (top) and the same weir X viewed parallel to the base area of the cascade tray (100) (bottom). In the lower depiction, the rectangular shape can readily be seen. In this simplest embodiment, the weir X is, viewed from above, a secant of the cascade tray (100) having a circular base area.

Figure 4B:
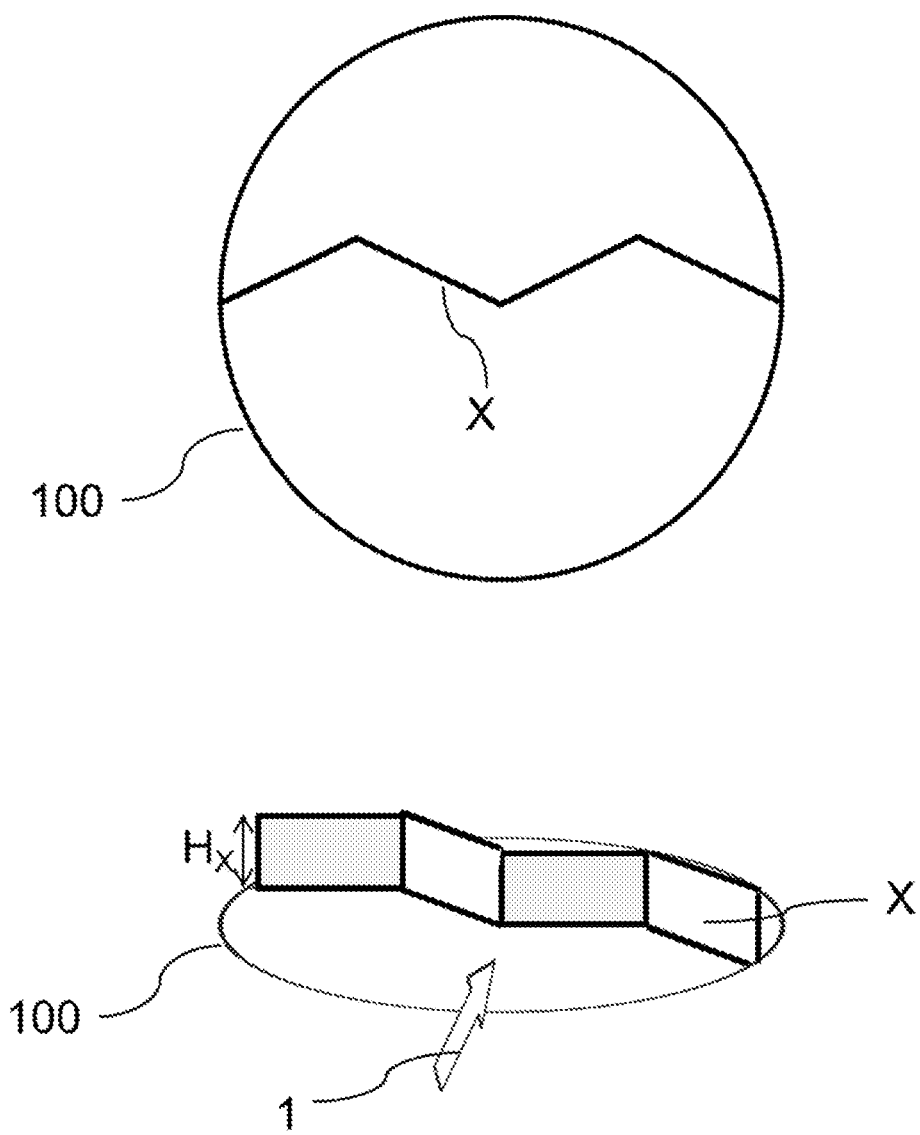
FIG. 4b shows the size and positioning of a differently shaped weir on a cascade tray, in top and perspective views.

FIG. 4b shows an example of a weir X which has a rectangular shape and has "kinks" in plan view (top) and the same weir X viewed parallel to the base area of the cascade tray (100) (bottom).

Figure 4C:
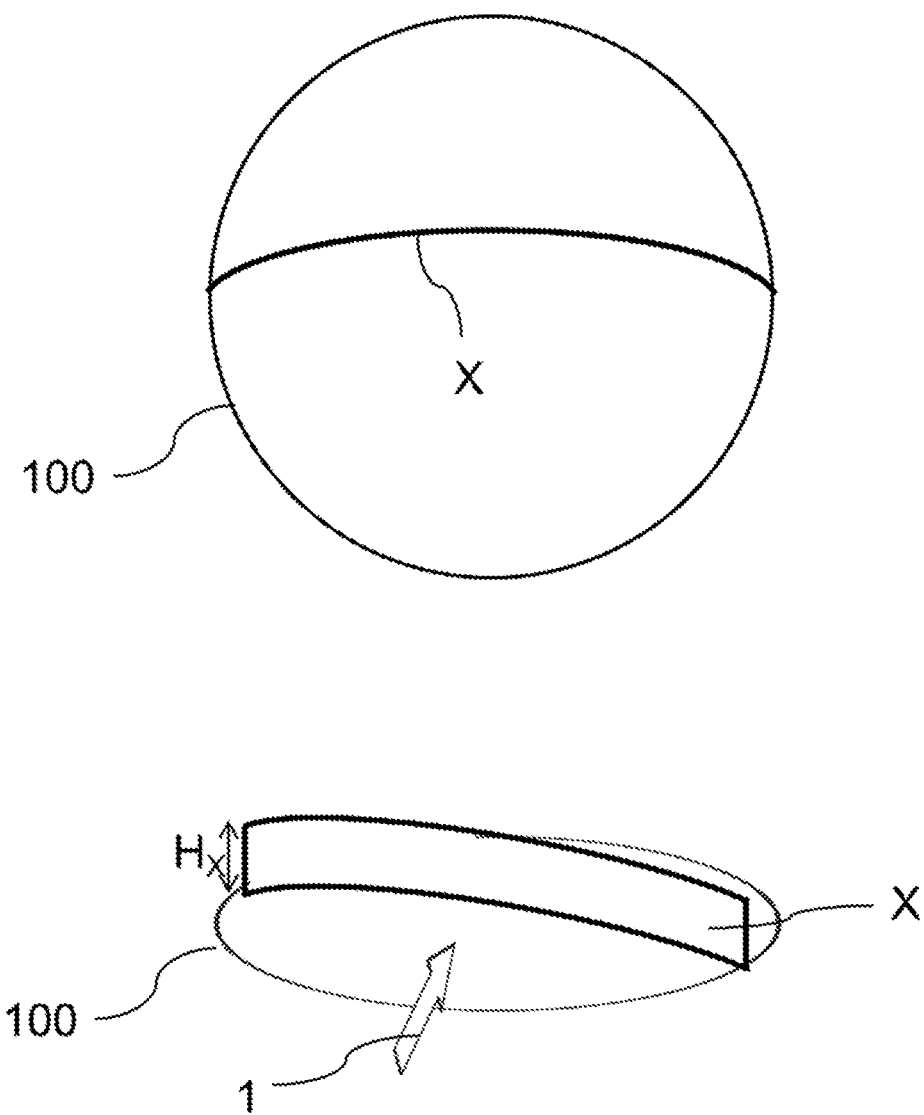
FIG. 4c shows the size and positioning of another differently shaped weir on a cascade tray, in top and perspective views.

FIG. 4c shows an example of a weir X which has a rectangular shape and is bent in plan view (top) and the same weir X viewed parallel to the base area of the cascade tray (100) (bottom).

The height $H_X$ of a weir X about which more will be said below is in these cases simply the height measured from the cascade tray to the upper edge of the weir X, as depicted in the drawings.

The embodiments shown in FIG. 4a to 4c are conceivable both for the cascade weir (600) and also the outflow weir (500). Preference is given to the embodiment as per FIG. 4a.

The embodiment (ii) is shown schematically in FIG. 5. The cutouts (X10) lead to formation of "pinnacles" (X20). The cutouts can not only be rectangular as shown in FIG. 5. A different shape, in particular a triangular shape, which leads to the formation of "serrations", is likewise possible. The height $H_X$ is in each case measured without the "pinnacles" (X20) or the "serrations", i.e. it is measured up to the height from which the cutouts commence, as shown in the drawing. In the embodiment (ii), too, the weirs X can have kinks as shown in FIG. 4b or be bent as shown in FIG. 4c. However, preference is here also given to the embodiment in which the weir X is, viewed from above, a secant of the cascade tray (100) having a round (in particular circular) base area.

The expression "arranged upstream of the outflow weir" and comparable formulations are based on the flow direction of the liquid (1) on the weir X. This is indicated by a block arrow in the figures FIG. 4 and FIG. 5.

A summary of various possible embodiments of the invention will firstly be given below:

In a first embodiment of the rectification column (10 000) of the invention, which can be combined with all other embodiments, the openings (800) for passage of the ascending vapor (2) are selected from the group consisting of holes, valves, vales without movable parts and bubble caps.

In a second embodiment of the rectification column (10 000) of the invention, which can be combined with all other embodiments, the column body (200) has a cylindrical shape and has, in particular, an internal diameter of from 2.0 m to 6.0 m, preferably from 2.5 m to 4.0 m.

In a third embodiment of the rectification column (10 000) of the invention, which can be combined with all other embodiments, the lower edges of the openings (900) are located in the lower third of the height $H_{600}$ of the cascade weir (600) (for the definition of $H_{600}$, see the explanations below and in FIGS. 4, 5, 7 and 8).

In a fourth embodiment of the rectification column (10 000) of the invention, which can be combined with all the above mentioned embodiments, the outflow weir (500) has openings (910).

In a fifth embodiment of the rectification column (10 000) of the invention, which is a particular variant of the fourth embodiment, the height $H_{700}$ of the offset (700) is selected so that this height $H_{700}$ is, over the entire working range of the rectification column (10 000), higher than the liquid level (=liquid surface; for the purposes of the present invention, the term liquid level or liquid surface is always the height of the liquid surface measured from the respective part (of the respective plane)) respectively present in the part (120) of the cascade tray (100) containing the outflow weir (500) in continuous operation.

In a sixth embodiment of the rectification column (10 000) of the invention, which is an alternative to the fourth embodiment and can otherwise be combined with all other embodiments, the outflow weir (500) does not have openings.

In a seventh embodiment of the rectification column (10 000) of the invention, which is a particular variant of the sixth embodiment, the height of the outflow weir (500), $H_{500}$, the height of the offset (700), $H_{700}$, and the height of the upper edge of the openings (900) above the cascade tray (100), $H_{900}$, are matched to one another in such a way that the openings (900) in the cascade weir (600) are, over the entire working range of the rectification column (10 000), completely covered during continuous operation by the liquid (1) present in the part (120) of the cascade tray (100) containing the outflow weir (500).

In an eighth embodiment of the rectification column (10 000) of the invention, which is a particular variant of the sixth and seventh embodiment, the cascade weir (600) has a greater height $H_{600}$ than the outflow weir (500, $H_{500}$), with the height difference $H_{600}-H_{500}$ being selected so that, especially over the entire working range of the rectification column (10 000), substantially the same, preferably the same, liquid level is established on the part (120) of the cascade tray (100) containing the outflow weir (500) and on the upstream part (110) of the cascade tray (100). For further explanations, reference is made to the detailed description below.

In a ninth embodiment of the rectification column (10 000) of the invention, which is a particular embodiment of the sixth and seventh embodiments and is an alternative to the eighth embodiment, the cascade weir (600) does not have any cutouts with the exception of the openings (900) up to a height $H_{600}$, where the cascade weir is provided with preferably rectangular cutouts (610) having a length $L_{610}$ at regular intervals over its length $L_{600}$ above the height $H_{600}$, the height $H_{600}$ is equal to the height $H_{500}$ of the outflow weir (500), the sum of the lengths $L_{610}$ is so much smaller than the length $L_{500}$ that, especially over the entire working range of the rectification column (10 000), substantially the same, preferably the same, liquid level is established on the part (120) of the cascade tray (100) containing the outflow weir (500) and on the upstream part (110) of the cascade tray.

For further explanations, reference may be made to the detailed description below.

In a first embodiment of the method of the invention for operating the rectification column (10 000) of the invention, which is particularly suitable for the fourth and fifth embodiments of the rectification column (10 000) of the invention, the loading of the rectification column (10 000) with the mixture (10) of materials is, in continuous operation, selected so that the openings (900) in the cascade weir (600) are not covered by the liquid (1) present on the part (120) of the cascade tray (100) containing the outflow weir (500).

In a second embodiment of the method of the invention for operating the rectification column (10 000) of the invention, which is particularly suitable for the sixth to ninth embodiments of the rectification column (10 000) of the invention, the loading of the rectification column (10 000) with the mixture (10) of materials is, in continuous operation, selected so that the openings (900) in the cascade weir (600) are always covered by the liquid (1) present on the part (120) of the cascade tray (100) containing the outflow weir (500).

In the first embodiment of the use according to the invention of the rectification column (10 000) of the invention for separating specific mixtures (10) of materials, which can be combined with all embodiments of the rectification column (10 000) of the invention, the mixture (10) to be separated is selected from the group consisting of water-containing and/or solvent-containing organic product mixtures which are in particular crude process products, which have optionally only be subjected to phase separation for separating off water of reaction, process products from chemical processes, in particular chemical processes for preparing toluenediamine, tolylene diisocyanate, aniline, diamines and polyamines of the diphenylmethane series, diisocyanates and polyisocyanates of the diphenylmethane series or phenol;

low boiler- and/or high boiler-containing organic product mixtures which are, in particular, prepurified process products which have been freed of water and optionally any solvent present, process products from chemical processes, in particular chemical processes for preparing toluenediamine, tolylene diisocyanate, aniline, diamines and polyamines of the diphenylmethane series, diisocyanates and polyisocyanates of the diphenylmethane series or phenol (for the definition of the terms low boiler and high boiler, see the explanations below);

and oil mixtures, in particular crude oil, liquefied gas, gasoline, kerosene, diesel fuel, heating oil, vegetable oil.

The embodiments indicated briefly above and further possible embodiments of the invention are described in more detail below. Various embodiments can be combined with one another in any way, unless something different is ambiguously clear to a person skilled in the art from the technical context.

It goes without saying that the rectification column (10 000) of the invention, which comprises a cascade tray (100) according to the invention, can be and if necessary is equipped with all peripheral devices customary in the prior art, especially vaporizers and condensers. A rectification column (10 000) according to the invention can also contain, in addition to the at least one cascade tray (100) and the devices necessary for the operation thereof, further internals customary in the prior art, especially other uncascaded trays, random packing elements and/or structured packings and also liquid collectors and distributors. All these devices and the use thereof are well known to a person skilled in the art and will therefore not be especially mentioned and explained in the following.

The openings (800) in the cascade tray (100) according to the invention are preferably selected from the group consisting of holes, valves, valves without movable parts and bubble caps. The cascade tray (100) of the invention preferably has a round (in particular circular) base area since rectification columns (10 000) according to the invention preferably have a column body (200) which has a cylindrical shape and, in particular, has an internal diameter of from 2.0 m to 6.0 m, preferably from 2.5 m to 4.0 m.

For the liquid (1) to be able to be pass through the cascade weir (600) even at a low liquid level, the openings (900) are preferably located at the bottom of the cascade weir (600), i.e. the lower edge of the openings (900) is preferably in the lower third of the height $H_{600}$ of the weir, the effective weir height (the effective weir height is the minimum height of liquid which leads to the liquid overflowing over the weir; in the case of a "picket fence" design, this is the height "without pinnacles" or without "serrations", as explained below). The openings (900) are preferably circular, square or rectangular holes, with the total area of the openings preferably being from 0.5% to 3.0%, particularly preferably from 0.8% to 1.5%, of the total area which the cascade weir (600) would have without openings (900). The cascade weir preferably has from 1 to 20, in particular from 1 to 6, openings (900).

As a result, banking up and complete raining-down of the liquid (1) on the inflow side (110) of the cascade tray (600) is no longer possible.

Figure 6:
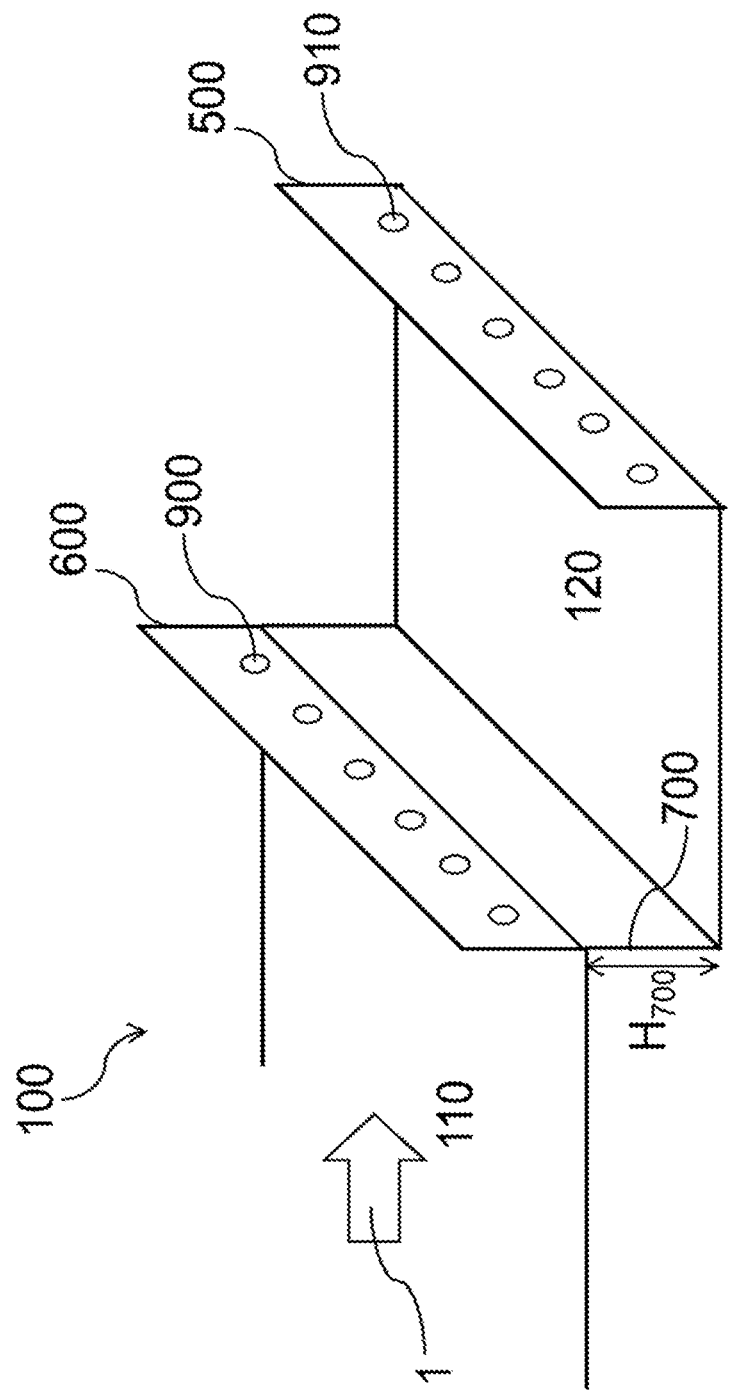
FIG. 6 is a perspective view of a variant of the invention where both the cascade weir and the outflow weir have openings.

In a first variant of the invention, both weirs, i.e. the cascade weir (600) and the outflow weir (500), are provided with openings (900, 910). This variant is shown in FIG. 6, in which the cascade tray (100) is, merely for reasons of simplification of the drawing, depicted with a rectangular shape; in this embodiment, too, a round, in particular circular, base area as shown in FIG. 2, FIG. 4 and FIG. 5 is preferred. The installation of openings in both weirs assists maintenance of a liquid level which is substantially the same (i.e. deviating by not more than 5%, based on the highest liquid level) on both parts (110, 120) of the cascade tray (100). As regards the preferred configuration of type, number and size of the openings (910), what has said above for the openings (900) also applies.

In this variant, the offset (700) preferably has a height $H_{700}$ which is, over the entire working range of the rectification column (10 000), higher than the liquid level present in the part (120) of the cascade tray (100) during continuous operation. The expression "in the entire working range of the rectification column (10 000)" relates, for the purposes of the present invention, to the entire breadth of the possible throughput of mixture (10) of materials through the rectification column (10 000) up to the maximum loading. The maximum loading of the rectification column (10 000) with the mixture (10) of materials is the maximum possible throughput (e.g. in kg/h) of mixture (10) at which satisfactory separation is still achieved, taking into account the boundary conditions of the rectification column (10 000) (height, internal diameter, type and number of separation-active internals). In addition, there is also a lower limit to the throughput at which satisfactory separation is still achieved, namely the minimum loading.

As a result of this measure, the openings (900) in the cascade weir (600) are not covered by the liquid on the second half (120) of the tray and the liquid (1) can run down freely through the openings in both weirs. The risk of reduced passage of the liquid (1) through the openings in the cascade weir (600) (and thus ultimately the risk of different liquid levels on the two halves (110, 120) of the tray) is minimized thereby. Under the fixed conditions in terms of apparatus, the loading of the rectification column (10 000) with the mixture (10) of materials in continuous operation of the rectification column (10 000) is preferably selected so that the openings (900) in the cascade weir (600) are not covered by the liquid (1) present on the part (120) of the cascade tray (100).

This first variant is one possible way of ensuring that the same amount of liquid passes through both the cascade weir (600) and the outflow weir (500) through the respective openings (900, 910) during operation of the rectification column (10 000). The remaining amount of liquid which overflows over the weir is thus the same for both weirs. If the weirs are appropriately configured (greater weir height of the cascade weir or use of a cascade weir having cutouts as described above), the same liquid level is thus established on both halves (110, 120) of the tray.

Figure 7:
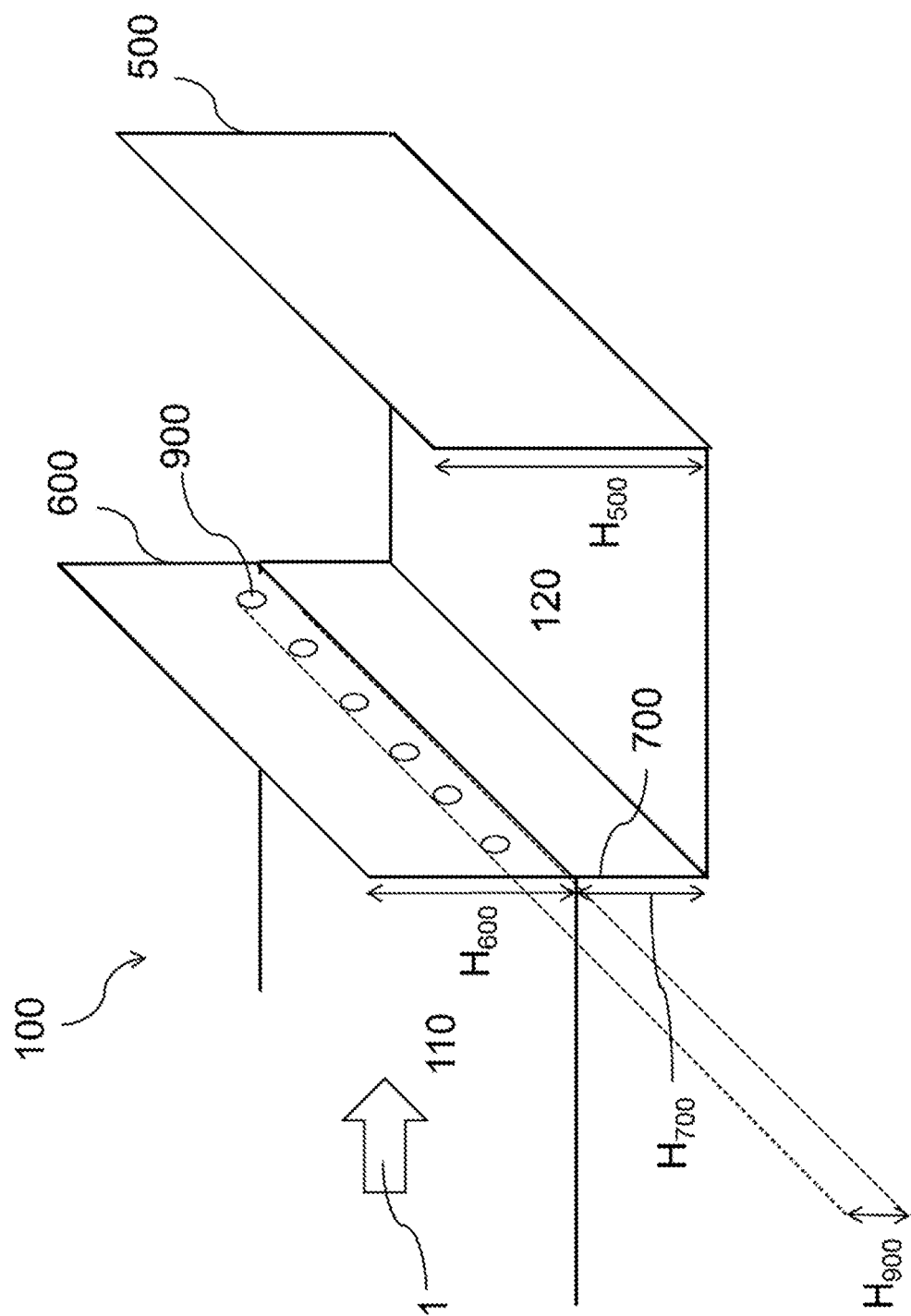
FIG. 7 is a perspective view of another variant of the invention where the cascade weir has openings, and the outflow weir does not have openings.

In a second variant of the invention, only the cascade weir has openings (900). As a result of this measure, too, maintenance of a liquid level which is substantially the same (i.e. deviating by a maximum of 5%, based on the highest liquid level) on both parts (110, 120) of the cascade tray (100) is assisted. This embodiment is shown in FIG. 7, in which the cascade tray (100) is depicted with a rectangular shape merely for reasons of simplification of the drawing; in this variant too, a round, especially circular, base area as shown in FIG. 2, FIG. 4 and FIG. 5 is preferred. In this variant, the height of the outflow (500), $H_{500}$, the height of the offset (700), $H_{700}$, and the height (measured from the part 110 of the cascade tray) of the upper edge of the openings (900)

above the cascade tray (100), $H_{900}$, are preferably matched to one another so that the openings (900) in the cascade weir (600) are, over the entire working range of the rectification column (10 000), covered by the liquid (1) present in the part (120) of the cascade tray (100) during continuous operation of the rectification column (10 000). In practice, this can be realized most simply by matching the height of the outflow weir $H_{500}$ and the height of the upper edge of the openings $H_{900}$ appropriately at a given value of the offset $H_{700}$. The covering of the openings (900) during continuous operation of the rectification column (10 000) leads to the liquid flow through the openings (900) decreasing when both halves (110, 120) of the tray are completely filled with liquid, so that a major part of the liquid (1) once again overflows over the cascade weir (600). To reduce the amount which overflows and thus also the overflow height by means of the remaining liquid flow through the openings (900), it is possible either to raise the cascade weir somewhat (first embodiment) or else to reduce the active overflow length of the cascade weir (600) so that the liquid flow through the openings (900) is just equalized (second embodiment).

In the first embodiment of this second variant, the cascade weir (600) has a greater height $H_{600}$ than the outflow weir (500, $H_{500}$), with the height difference $H_{600}$–$H_{500}$ being selected so that, especially over the entire working range of the rectification column (10 000), substantially the same, preferably the same, liquid level is established on both parts (110, 120) of the cascade tray (100) even though the amount of liquid overflowing over the cascade weir (600) has been reduced by the flow through the openings (900) in the cascade weir (600). Here, "substantially the same liquid level" means that the liquid levels in the individual parts (110, 120) (or planes, see the explanations above) of the cascade tray (100) differ by not more than 5%, based on the highest liquid level. If the cascade tray has more than two parts (more than two planes), the greatest difference between two liquid levels is not more than 5%, based on the highest liquid level. The feature "liquid level" relates to the height of the liquid surface measured from the respective part (from the respective plane).

In an alternative second embodiment of the second variant, the cascade weir (600) has no cutouts with the exception of the openings (900) up to a height $H_{600}$, where
  the cascade weir is provided with, in particular rectangular, cutouts (610) having the length $L_{610}$ at regular intervals over its length $L_{600}$ above the height $H_{600}$,
  the height $H_{600}$ is equal to the height $H_{500}$ of the outflow weir (500),
  the sum of the lengths $L_{610}$ is so much smaller than the length $L_{500}$ that, in particular over the entire working range of the rectification column (10 000), substantially the same, preferably the same, liquid level is established on both parts (110, 120) of the cascade tray even though the amount of liquid overflowing over the cascade weir (600) is reduced by the flow through the openings (900) in the cascade weir (600).

"Substantially the same liquid level" here means, as defined above, that the liquid levels in the individual parts (110, 120) (or planes, see the explanations above) of the cascade tray (100) differ from one another by not more than 5%, based on the highest liquid level. If the cascade tray has more than two parts (more than two planes), the greatest difference between two liquid levels is not more than 5%, based on the highest liquid level. The feature "liquid level" relates to the height of the liquid surface measured from the respective part (from the respective plane).

Figure 8:
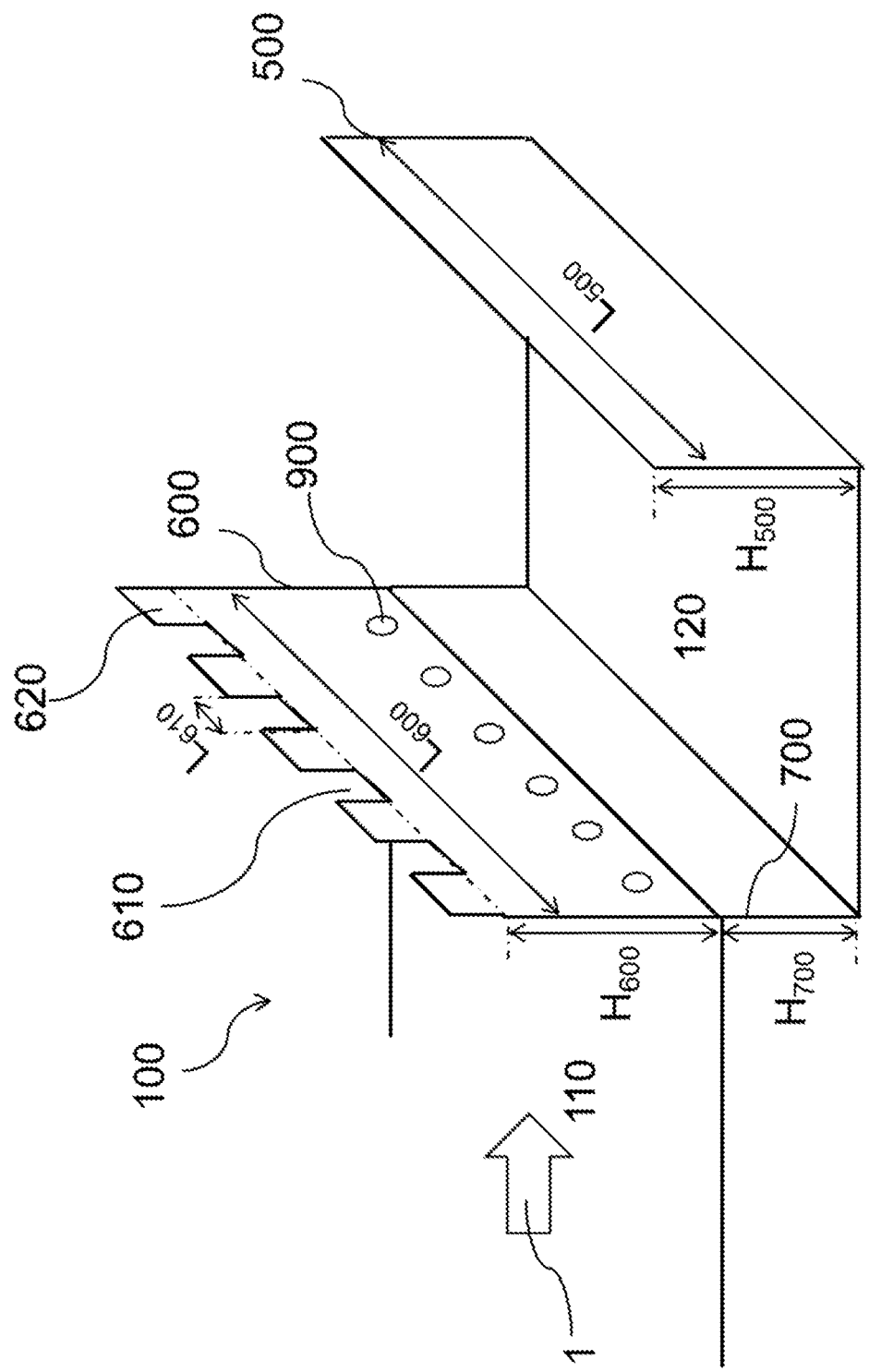
FIG. 8 is a perspective drawing in rectangular shape, showing the placement of a weir having pinnacles in a cascade tray.

This embodiment is shown in FIG. 8, in which the cascade tray (100) is shown with a rectangular shape merely for reasons of simplification of the drawing; in this embodiment, too, a round, in particular circular, base area as shown in FIG. 2, FIG. 4 and FIG. 5 is preferred. The cutouts (610) lead to formation of "pinnacles" (620); an embodiment having triangular "serrations" is likewise possible. As indicated above, the height of a weir in the case of the presence of cutouts as shown in FIG. 8 is, for the purposes of the present invention, always the height without pinnacles (or serrations). The length $L_{610}$ is, for the purposes of the present invention, the length of the cutouts at the largest position; i.e. in the case of triangular cutouts, $L_{610}$ is the length of the upper side of the triangle.

In all embodiments of the second variant, the rectification column (10000) is preferably operated in such a way that the loading thereof with the mixture (10) of materials in continuous operation is selected so that the openings (900) in the cascade weir (600) are always completely covered by the liquid (1) present on the part (120) of the cascade tray (100).

This second variant is a further possible way of ensuring that the same liquid level is established on both parts (110, 120) despite the flow of liquid through the openings (900) in the cascade weir (600) during operation of the rectification column (10 000).

The rectification column (10 000) of the invention is suitable for carrying out distillations under reduced, atmospheric and increased pressure. It can be used for many separation tasks. As suitable mixtures (10) of materials, mention may be made by way of example of:
  Water-containing and/or solvent-containing organic product mixtures, in particular crude process products, which have optionally been subjected merely to a phase separation for separating off water of reaction, from chemical processes, in particular chemical processes for preparing toluene diamine, tolylene diisocyanate, aniline, diamines and polyamines of the diphenylmethane series, diisocyanates and polyisocyanates of the diphenylmethane series or phenol—removal of water of reaction and optionally solvent to give prepurified organic product mixtures;
  Low boiler- and/or high boiler-containing organic product mixtures, in particular prepurified process products, which have been freed of water and any solvent present, from chemical processes, in particular chemical processes for preparing toluene diamine, tolylene diisocyanate, aniline, diamines and polyamines of the diphenylmethane series, diisocyanates and polyisocyanates of the diphenylmethane series or phenol—removal of high and low boilers for fine purification of organic products;
  Mixtures of isomeric organic compounds, in particular (E)/(Z) isomers, isomers of aromatic compounds such as the isomer mixtures of toluene diamine, isomer mixtures of tolylene diisocyanate, isomer mixtures of the diamines of the diphenylmethane series or isomer mixtures of the diisocyanates of the diphenyl methane series—isomer separation;
  Oil mixtures, in particular crude oil, liquefied gas, gasoline, kerosene, diesel fuel, heating oil, vegetable oils—refining of natural raw materials.

Here, the term low boilers refers to secondary components which have a boiling point below that of the product of value to be isolated. In an analogous way, secondary components which have a boiling point above that of the product of value to be isolated are referred to as high boilers.

The invention claimed is:

1. A cascade tray (100) suitable for contacting liquid (1) flowing downward in a column body (200) with ascending vapor (2), wherein the cascade tray (100) comprises:
   an outflow weir (500) for banking up downflowing liquid (1) and
   at least one further weir, that is a cascade weir (600), which is arranged upstream of the outflow weir, where the at least one cascade tray (100) has an offset (700) at the position of the at least one cascade weir (600) so that a part (120) of the cascade tray (100) containing the outflow weir (500) is at a lower level than an upstream part (110) of the cascade tray (100), and
   the part (120) of the cascade tray (100) containing the outflow weir (500) and the upstream part (110) of the cascade tray (100) each comprise openings (800) for passage of the ascending vapor (2), and
   wherein the cascade weir (600) has openings (900) for passage of the liquid (1).

2. A rectification column (10 000) for fractionating a mixture (10) of materials, comprising the cascade tray (100) of claim 1.

3. The rectification column (10 000) for fractionating a mixture (10) of materials of claim 2, wherein the cascade tray (100) is hydrodynamically connected at an inflow position (310), of the cascade tray (100), to a first reservoir (410) for liquid (1) flowing downward in the column body (200) and at another position opposite the inflow position (310), the outflow position (320), to a second reservoir (420) for accommodating liquid (1) flowing out from the cascade tray (100) via the outflow weir (500) and wherein the at least one cascade weir (600) is arranged between the inflow position (310) and the outflow position (320).

4. The rectification column (10 000) of claim 2, wherein the openings (800) for passage of the ascending vapor (2) are selected from the group consisting of holes, valves, valves without movable parts and bubble caps.

5. The rectification column (10 000) of claim 2, wherein the column body (200) has a cylindrical shape.

6. The rectification column (10 000) of claim 2, wherein the lower edges of the openings (900) are located in the bottom third of the height ($H_{600}$) the cascade weir (600).

7. The rectification column (10 000) of claim 2, wherein the outflow weir (500) has openings (910).

8. The rectification column (10 000) of claim 7, wherein the height ($H_{700}$) of the offset (700) is selected so that this height $H_{700}$ is, over the entire working range of the rectification column (10 000), higher than the liquid level respectively present in the part (120) of the cascade tray (100) containing the outflow weir (500) in continuous operation.

9. The rectification column (10 000) of claim 2, wherein the outflow weir (500) does not have openings.

10. The rectification column (10 000) of claim 9, wherein the height of the outflow weir (500), ($H_{500}$), the height of the offset (700), ($H_{700}$), and the height of the upper edge of the openings (900) above the cascade tray (100), ($H_{900}$), are matched to one another in such a way that the openings (900) in the cascade weir (600) are, over the entire working range of the rectification column (10 000), completely covered during continuous operation by the liquid (1) present in the part (120) of the cascade tray (100) containing the outflow weir (500).

11. The rectification column (10 000) of claim 9, wherein the cascade weir (600) has a greater height ($H_{600}$) than the outflow weir (500, $H_{500}$) and the height difference ($H_{600}$)–($H_{500}$) is selected so that the liquid level on the part (120) of the cascade tray (100) containing the outflow weir (500) does not differ by more than 5%, based on the highest liquid level, from the liquid level on the upstream part (110) of the cascade tray (100).

12. The rectification column (10 000) of claim 9, wherein the cascade weir (600) does not have any cutouts with the exception of the openings (900) up to a height ($H_{600}$), wherein the cascade weir is provided with cutouts (610) having the length ($L_{610}$) at regular intervals over its length $L_{600}$ above the height ($H_{600}$), the height ($H_{600}$) is equal to the height ($H_{500}$) of the outflow weir (500), the sum of the lengths ($L_{610}$) is so much smaller than the length ($L_{500}$) that the liquid level on the part (120) of the cascade tray (100) containing the outflow weir (500) does not differ by more than 5%, based on the highest liquid level, from the liquid level on the upstream part (110) of the cascade tray.

13. A method for operating a rectification column (10 000) of claim 3, wherein the loading of the rectification column (10 000) with the mixture (10) of materials is, in continuous operation, selected so that the openings (900) in the cascade weir (600) are not covered by the liquid (1) present on the part (120) of the cascade tray (100) containing the outflow weir (500).

14. A method for operating a rectification column of claim 3, wherein the loading of the rectification column (10 000) with the mixture (10) of materials is, in continuous operation, selected so that the openings (900) in the cascade weir (600) are always covered by the liquid (1) present on the part (120) of the cascade tray (100) containing the outflow weir (500).

15. A process for fractionating a mixture (10) of materials in the rectification column (10 000) of claim 2, wherein the mixture (10) of materials is selected from the group consisting of water-containing or solvent-containing organic product mixtures; low boiler- or high boiler-containing organic product mixtures; and oil mixtures.

* * * * *